United States Patent [19]

Tanner et al.

[11] Patent Number: 4,909,334

[45] Date of Patent: Mar. 20, 1990

[54] MACHINE FOR FILLING RUTS IN AGRICULTURAL FIELDS

[75] Inventors: Harvey W. Tanner; Max W. Tanner; David E. Tanner, all of Blackfoot, Id.

[73] Assignee: E. M. Tanner & Sons, Inc., Blackfoot, Id.

[21] Appl. No.: 355,204

[22] Filed: May 19, 1989

[51] Int. Cl.⁴ .................... A01B 33/04; A01B 39/14
[52] U.S. Cl. .......................... 172/58; 172/26; 172/676
[58] Field of Search ............ 172/57, 58, 98, 108, 172/107, 26, 676

[56] References Cited

U.S. PATENT DOCUMENTS

| | | | |
|---|---|---|---|
| 323,164 | 7/1885 | Laughlin | 172/98 X |
| 1,419,953 | 6/1922 | Binmore | 172/57 |
| 2,791,953 | 5/1957 | Erickson | 172/98 |
| 3,021,621 | 2/1962 | Needham | 172/58 X |
| 3,174,554 | 3/1965 | Wright | 172/58 |
| 3,750,758 | 8/1973 | Bancel | 172/58 |

FOREIGN PATENT DOCUMENTS

| | | | |
|---|---|---|---|
| 1266516 | 6/1961 | France | 172/58 |
| 171045 | 11/1921 | United Kingdom | 172/58 |
| 832554 | 4/1960 | United Kingdom | 172/58 |

Primary Examiner—Richard J. Johnson
Attorney, Agent, or Firm—Philip A. Mallinckrodt; Robert R. Mallinckrodt

[57] ABSTRACT

An agricultural machine for smoothing ruts, such as are produced in a field by center pivot sprinkler irrigation systems, comprises a pair of rotary tillers arranged in a unique frame for traveling over and along respectively opposite sides of the rut as such tillers are rotated toward each other to break up clods of soil ridged above the rut at opposite sides thereof and to largely fill and smooth the rut. A guide shoe carried by the frame midway between the rotary tillers is preferably provided to travel along the rut and maintain the rotary tillers at proper working positions, and a hood with outriggered side walls hinged thereto for outward swinging movement preferably covers the rotary tillers.

21 Claims, 4 Drawing Sheets

MACHINE FOR FILLING RUTS IN AGRICULTURAL FIELDS

BACKGROUND OF THE INVENTION

1. Field

This invention has to do with powered machines for running along ruts in agricultural fields to largely fill such ruts and smooth the fields so subsequent agricultural operations will not be hampered.

2. State of the Art

A variety of different machines of the type of and for the purpose for which the machine of the invention is concerned have been developed or proposed heretofore, but there remains a need for a more effective machine that is relatively simple and that can be economically produced.

Tractors and other wheeled equipment working in soft or muddy ground leave tracks that develop into deep ruts either immediately or over a period of time. The situation is particularly difficult in the case of center pivot sprinkler irrigation systems in which pneumatically-tired wheels, carrying and powering the sprinkler towers, repeatedly move in large circles over ground made wet and often muddy by irrigation water sprayed from the sprinklers.

Examples of prior art in this filed of inventive activity are shown by U.S. Pat. Nos. 1,887,348 of Nov. 8, 1932; Bean et al. No. 4,059,911 of Nov. 29, 1977; Corsentino U.S. Pat. No. 4,209,068 of June 24, 1980; Parish No. 4,262,752 of Apr. 21, 1981; Davis U.S. Pat. No. 4,308,921 of Jan. 5, 1982; and Parish U.S. Pat. No. 4,601,347 of July 22, 1986. All but one of these machines employ disks at respective opposite sides of the rut, which rotate by reason of ground friction as the machine moves along the rut and which are biased to push earth toward and into the rut, with or without a plow therebetween to loosen soil in the rut and to help keep the machine on track. Freeman employs spring teeth instead of disks and an advance guide wheel therebetween instead of a plow.

BRIEF SUMMARY OF THE INVENTION

In accordance with the present invention, a pair of powered rotary tillers are provided for breaking up clods at opposite sides of the rut and, because they are each rotated toward the rut under power, for positively displacing into the rut the broken up and largely pulverized clods and other earth materials along the sides of the rut. For guiding the machine along the rut at a given elevation for the tillers, a sliding shoe, preferably of box formation with open back, closed front, and slide plate bottom, and with sides bowed outwardly and pivoted at their forward ends for sidewise adjustment, is provided in front of and between the rotary tillers.

The rotary tillers are preferably mounted so that their spacing from each other transversely of the machine can be adjusted for different rut widths, and a hood is preferably provided over the tillers to prevent scattering of earth picked up by the tillers.

THE DRAWINGS

The best mode presently contemplated for carrying out the invention in practice is shown in the accompanying drawings, in which:

FIG. 1 represents a pictorial view looking from the rear of a presently preferred embodiment of the machine of the invention constructed for attachment, and shown attached, to the customary three-point hitch of a typical farm tractor and powered from the customary power take-off of the tractor, the tractor appearing only schematically;

FIG. 2, a similar view looking from the right side of FIG. 1;

FIG. 3, a view in top plan;

FIG. 4, a view in transverse vertical section taken on the line 4—4 of FIG. 3;

FIG. 5, a vertical section taken transversely across a typical deep rut in an irrigated field caused by a central pivot irrigation sprinkler tower, the rut being shown before being filled by the machine of the invention; and FIG. 6, a similar view after smoothing and filling of the rut by the machine of the invention.

DETAILED DESCRIPTION OF THE ILLUSTRATED EMBODIMENT

Figure 1:
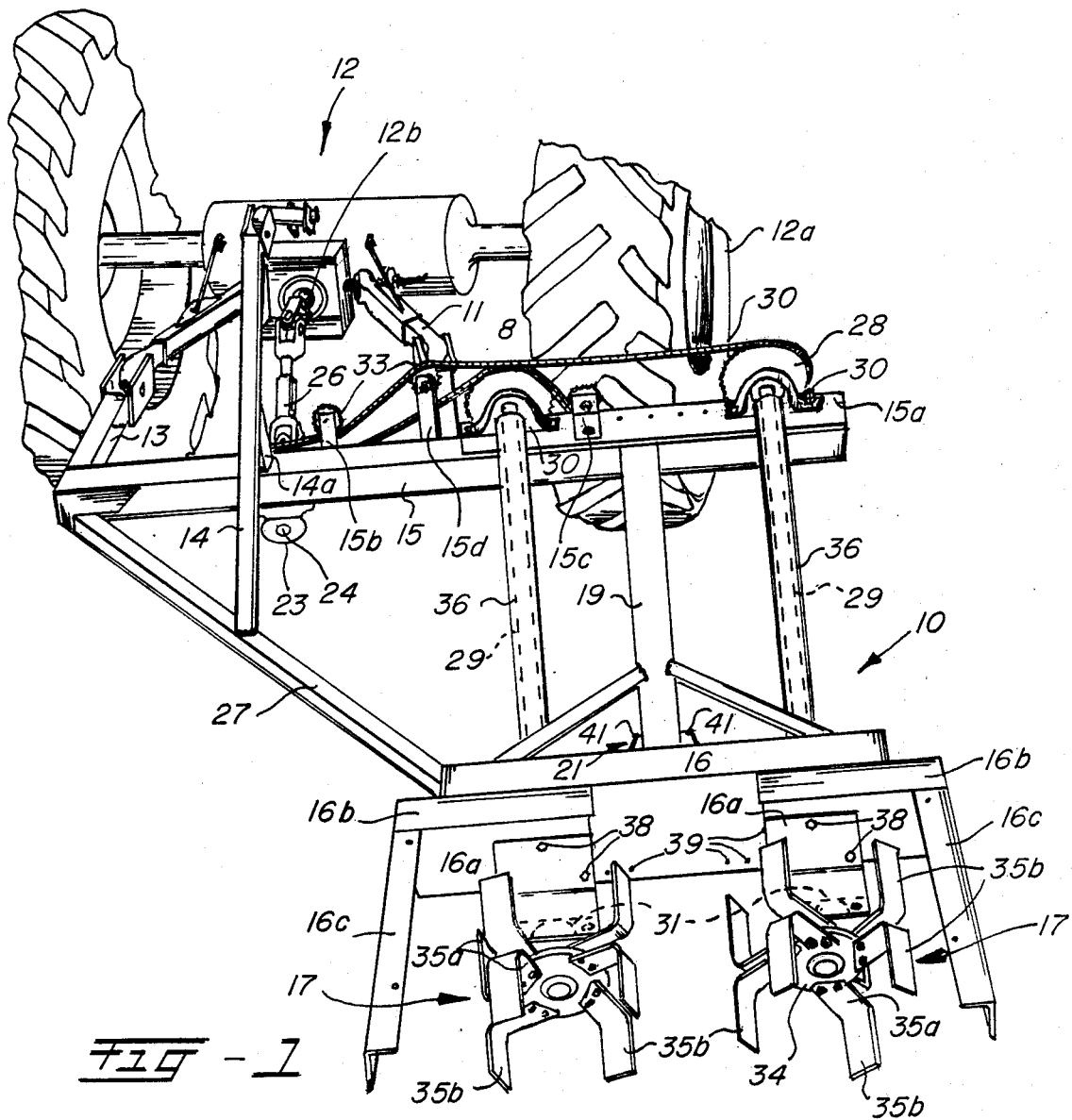
Figure 2:
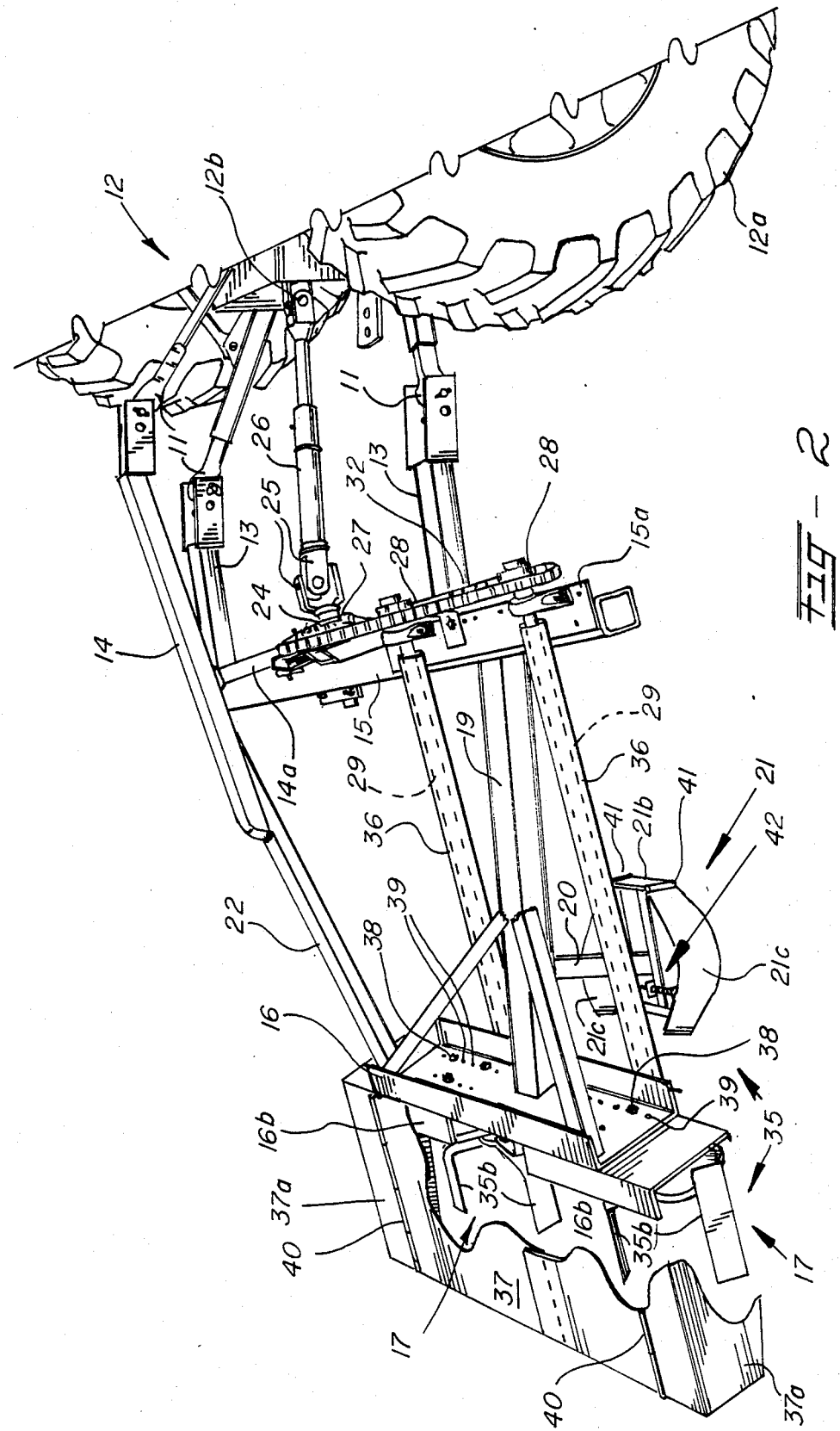
Figure 3:
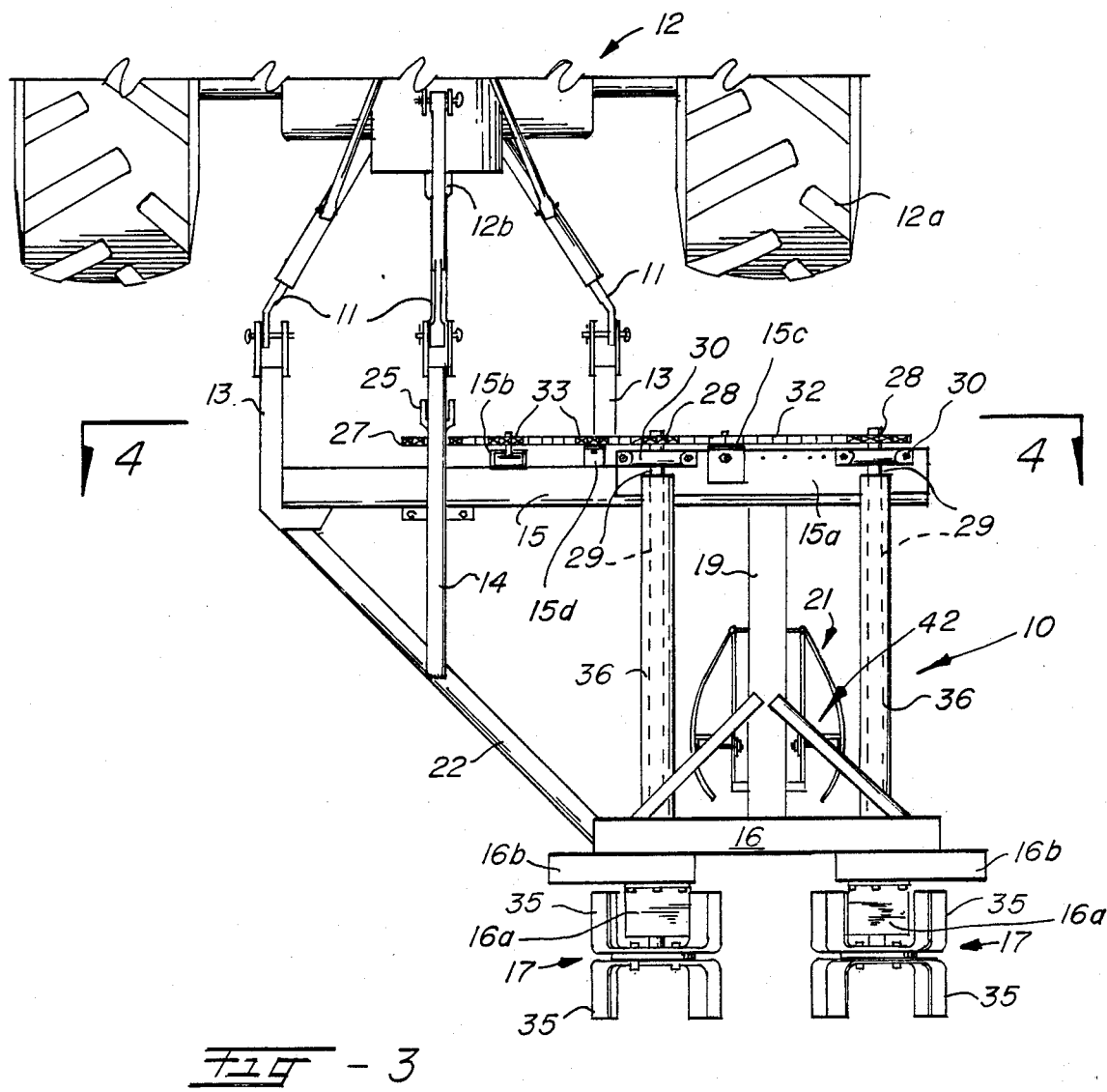

As illustrated in FIGS. 1–3, the machine 10 of the invention is attached in customary manner to the usual three point hitch 11 of a standard farm tractor 12 by a pair of lower arms 13, respectively, and by an upper arm 14, all of which extend forwardly from rigid securement to the supporting framework of the machine at one side thereof so the machine will be centered behind one of the rear traction wheels, here 12a, of the tractor.

Such framework includes a forward transverse frame member 15, here shown as a structural steel tube of square cross-section, carrying on a forwardly projecting, superimposed plate 15a a power train to be described hereinafter and from one end portion of which tubular member 15, here the left-hand end portion in FIG. 1, the arms 13 extend. Arm 14 is supported on frame member 15 by a structural member 14a, FIG. 2. The framework also includes a relatively short, rear transverse frame member 16, here shown as a deep structural steel channel, extending along and in parallel with the end portion of the front transverse frame member 15 at the other side of the machine, here the right-hand end portion in FIG. 1, from which frame member 16 the rotary tillers 17, respectively, depend for working the soil that is ridged along opposite sides of a rut, for example, the deep rut 18 shown in FIG. 5 as made by a standard center pivot irrigation sprinkler tower (not shown).

Extending longitudinally between the transverse frame members 15 and 16 is a central beam 19, from which rigidly depends a post 20, FIG. 2, having a guide shoe 21 rigidly affixed to its lower end. Such guide shoe slides along and within the rut 18 as the tractor and machine travel above and along the rut.

A diagonal frame member 22 extends from rigid securement to that end of rear transverse frame member 16 that is intermediate the length span of front transverse member 15, to rigid securement to the adjacent end of such front transverse member 15, and upper hitch attachment arm 14 extends longitudinally upwardly and forwardly from rigid securement to such diagonal frame member 22 intermediate the length thereof.

Extending forwardly from journaling in a longitudinally spaced pair of pillow blocks 23, FIGS. 1 and 2, that depend from attachment to the underside of forward transverse frame member 15 intermediate the end portion thereof that extends beyond rear transverse frame member 16, is a stub shaft 24 which has one portion of a universal joint 25 secured to its forward end.

The other portion of universal joint 25 is secured to the confronting end of a telescoped shaft 26, whose other end is adapted to engage, and, as shown, is engaged, with the power take-off 12b of tractor 12.

Figure 4:
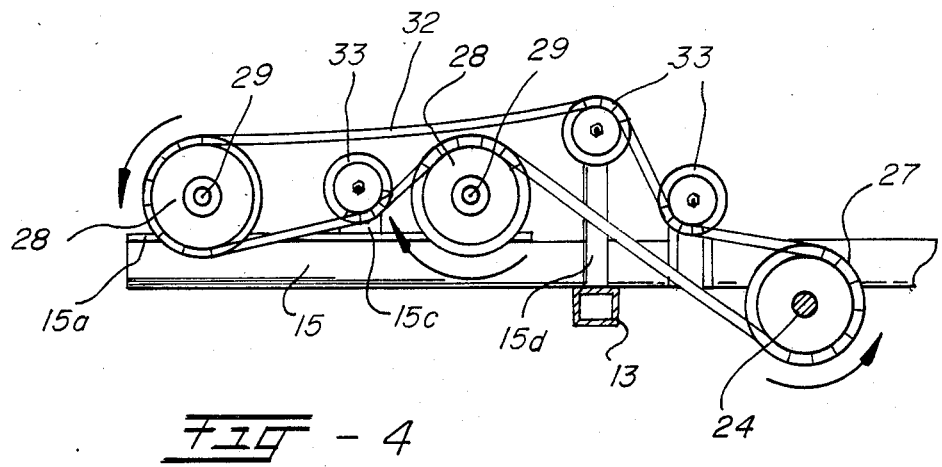

The power train carried on plate 15a by the forward transverse frame member 15, see particularly FIG. 4, comprises a sprocket wheel 27 affixed to stub shaft 24 and sprocket wheels 28, respectively, affixed to corresponding ends of respective tiller shafts 29 that are journaled at their forward ends in pillow block journal bearings 30, respectively, FIGS. 1 and 2, attached to and resting on forward transverse frame member 15, and, at their rearward ends, in pillow block journal bearings 31, respectively, carried by and depending from angle plates 16a that are attached to adjustable structural components 16b, respectively, of rear transverse frame member 16. A sprocket chain 32 extends around sprocket wheel 27 as the drive, then over the top of the adjacent sprocket wheel 28 and around the other sprocket wheel 28 so as to drive the two sprocket wheels 28 in opposite directions. Idler sprockets 33, respectively, FIGS. 1 and 4, are provided to insure positive mesh of sprocket chain with sprocket wheels, one of which idler sprockets is mounted for rotation and up and down adjustment in a vertical slideway 15b and another of which is rotatably mounted in bracket 15c for transverse adjustment on frame member 15 to partially compensate for variations in chain length due to adjustments in transverse spacing of tiller shafts 29 relative to each other as will be explained hereinafter. The other idler sprocket 33 is rotatably mounted in a column 15d.

The rotary tillers 17 as here shown each comprise a hub 34 rigidly affixed to the rear end of its corresponding tiller shaft 29 and paired sets of tiller blades 35 which are evenly spaced about the circumference of the hub. Each tiller blade 35 is bent to provide a portion 35a for attachment flatwise against the hub and a portion 35b which extends substantially perpendicularly to the hub as a digger. Thus, each tiller 17 has its digger blade portions 35b extending longitudinally of the machine forwardly and backwardly and at respectively opposite sides of the hub.

For safety reasons, each tiller shaft 29 is preferably protectively encased by and rotates within a stationary tube 36 extending between the forward and rear transverse frame members 15 and 16, respectively, and for preventing scattering of earth picked up by the rotary tillers 17, such rotary tillers are preferably covered by an open-bottomed hood 37, FIG. 2, carried by structural attachments to rear transverse frame member 16.

Since ruts vary in width depending upon the size of the wheels of equipment traveling in an agricultural field, it is desirable that the rotary tillers 17 be mounted so that their transverse spacing relative to each other can be adjusted. To enable such adjustment, structural components 16b are fastened to rear transverse frame member 16, face-to-face therewith, as shown in FIGS. 1 and 2, by bolts 38, series of transversely spaced bolt holes 39 being provided through the structural steel channel constituting the principal part of rear transverse frame member 16 for selective use in bolting the components 16b in their adjusted positions. The pillow block journal bearings 31 for tiller shafts 29 are fastened to and depend from the bottoms of the respective angle plates 16a that are attached as by welding to the corresponding adjustment structural components 16b and are therefor positionally adjusted along with adjustment of members 16a. For the same adjustment purpose, the pillow block journal bearings 30 are similarly selectively bolted to the top of transverse frame member 15.

Guide shoe 21 serves to guide the machine along the rut at a given elevation, corresponding to the level of the field. For this purpose, it is advantageously of box formation, FIGS. 2 and 3, open at the top and rear with slide plate bottom 21a sloping upwardly toward a closed front 21b and with side walls 21c, respectively bowed outwardly and pivoted at their forward ends, as at 41, with an adjustable securement arrangement 42 for varying the sideward sweep of such side walls and for holding them in place following any positional adjustment. Hood 37 is of two part overlapped construction as shown for adjustment purposes. The overlapped parts are fastened to the tops of adjustment structural members 16b, respectively, and are supported laterally by arms 16c rearwardly extending from securement to rear tranverse member 16. Its rear is open, but it has outriggered side walls 37a, FIG. 2, hinged at 40 to hang downwardly in close adjacency to the corresponding rotary tillers 17 laterally thereof so as to swing outwardly in accommodating any large rocks that are part of the earth materials picked up and thrown sidewardly by such rotary tillers.

Since one wheel of the tractor will be running within the furrow, there should be a substantially compensating transverse downward slop of the machine of the invention from the side thereof that is adjacent such wheel to the opposite side so the machine will be substantially level when traveling through the field for its intended purpose. Typically, the angle will be about five degrees.

Although the embodiment here illustrated and described is constructed as an implement to be attached behind a tractor and drawn around a field by the tractor, the machine may be constructed to be self-propelled with corresponding changes in drive components.

Figure 5:
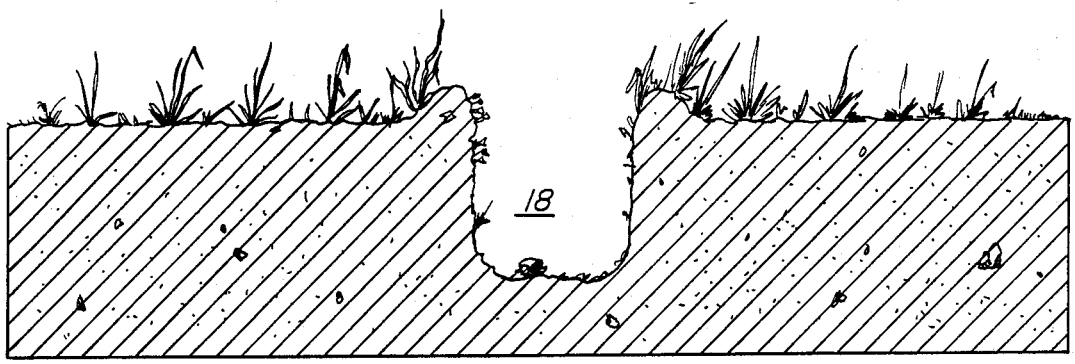
Figure 6:
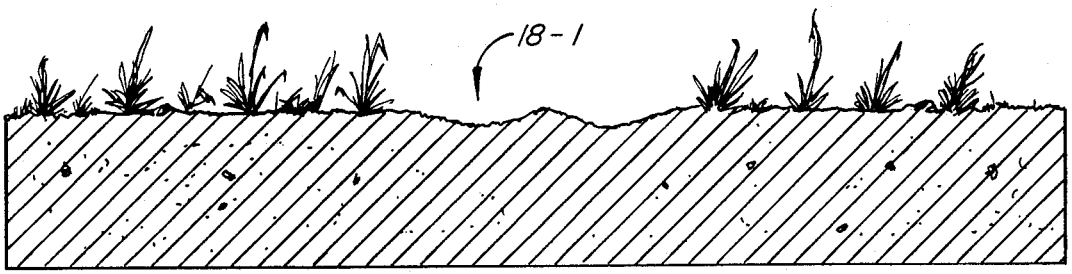

The deep furrow 18 of FIG. 5 is shown at 18-1 in FIG. 6 as filled and smoothed by the machine of the invention.

Whereas this invention is here illustrated and described with specific reference to an embodiment thereof presently contemplated as the best mode of carrying out such invention in actual practice, it is to be understood that various changes may be made in adapting the invention to different embodiments without departing from the broader inventive concepts disclosed herein and comprehended by the claims that follow.

We claim:

1. An agricultural machine for smoothing ruts in a field, comprising a structural frame adapted to travel over and along a rut in the field; a pair of laterally spaced rotary tillers carried by said frame and spaced so as to operate on earth material along opposite sides of a rut to be smoothed, said tillers being mounted for rotation in opposite directions so their bottoms rotate toward each other and each having sets of blades adapted to dip into and to push said earth material toward and into the rut while breaking up any clods along the rut; means for powering said machine and for causing it to be transported about the field at working level; and a guide shoe of box formation open at the top and at its rear with side walls bowed outwardly and a closed front, the bottom of the guide shoe sloping upwardly and forwardly, said side walls being pivoted at their forward ends for positional adjustment inwardly and outwardly, and said guide shoe being carried by the frame between and in advance of the rotary tillers for running within and along the rut as the machine travels.

2. An agricultural machine according to claim 1, wherein the rotary tillers each have a hub connected to the powering means for rotation thereby; and wherein each set of blades comprises a pair of blades fastened to said hub about the circumference thereof, each blade of a pair having a portion fastened to the hub and a portion extending longitudinally of the machine as a digger.

3. An agricultural machine according to claim 1, wherein the rotary tillers are mounted by means that provide for adjustment of the transverse spacing relative to each other.

4. An agricultural machine according to claim 1, wherein the structural frame is constructed so that the means for powering the machine is located at one side of the machine and the rotary tillers are located at the opposite side of the machine.

5. An agricultural machine for smoothing ruts in a field, comprising a structural frame adapted to travel over and along a rut in the field; a pair of laterally spaced rotary tillers carried by said frame and spaced so as to operate on earth material along opposite sides of a rut to be smoothed, said tillers being mounted for rotation in opposite directions so their bottoms rotate toward each other and each having sets of blades adapted to dip into and to push said earth material toward and into the rut while breaking up any clods along the rut, said structural frame having a forward transverse frame member substantially defining the width of the machine, a shorter rear transverse frame member substantially coextensive with the portion of said structural frame that carries the rotary tillers, and a longitudinal frame member rigidly interconnecting said forward and said rear transverse frame members; and means for powering said machine and for causing it to be transported about the field at working level, said powering means being located at one side of the machine and the rotary tillers being located at the opposite side of the machine.

6. An agricultural machine according to claim 5, wherein the pair of rotary tillers are carried by the rear ends of respective transversely spaced tiller shafts that extend longitudinally between and are carried for rotation by the transverse frame members; and wherein the means for powering the machine includes power transmission means carried by the forward transverse frame member and connected to said tiller shafts for rotating them toward each other.

7. An agricultural machine according to claim 6, wherein the power transmission means comprise sprocket wheels, affixed, respectively, to forward ends of the tiller shafts; a sprocket affixed to a powered drive shaft; and a sprocket chain interconnecting said sprocket wheels with said sprocket.

8. An agricultural machine according to claim 7, wherein means are provided for adjusting the transverse spacing of the tiller shafts; and means are provided for taking up or for providing slack in the sprocket chain to accommodate adjustments in the transverse spacing of said tiller shafts.

9. An agricultural machine according to claim 5, wherein the pair of rotary tillers are carried by the rear ends of respective transversely spaced tiller shafts that extend longitudinally between and are carried for rotation by the transverse frame members; and wherein the means for powering the machine includes power transmission means carried by the forward transverse frame member and connected to said tiller shafts for rotating them toward each other.

10. An agricultural machine according to claim 9, wherein the power transmission means comprise sprocket wheels, affixed, respectively, to forward ends of the tiller shafts; a sprocket affixed to a shaft adapted for connection to the power take-off of a farm tractor hauling the machine; and a sprocket chain interconnecting said sprocket wheels with said sprocket.

11. An agricultural machine according to claim 10, wherein the rear transverse frame member is deeper than the forward transverse frame member and has an earth deflecting hood for the rotary tillers attached thereto.

12. An agricultural machine according to claim 11, wherein the hood has a top wall and outriggered side walls hinged to opposite sides, respectively, of the top wall.

13. An agricultural machine according to claim 12, wherein the rear transverse frame member has transversely adjustable structural components adjustably secured thereto; and wherein the top wall of the hood is in two parts overlapped longitudinally of the machine, said parts being secured to the tops of said transversely adjustable structural components, respectively.

14. An agricultural machine according to claim 5, including a guide shoe carried by the frame.

15. An agricultural machine for smoothing ruts in a field, comprising a structural frame adapted to travel over and along a rut in the field; a pair of laterally spaced rotary tillers carried by said frame and spaced so as to operate on earth material along opposite sides of a rut to be smoothed, said tillers being mounted for rotation in opposite directions so their bottoms rotate toward each other and each having sets of blades adapted to dip into and to push said earth material toward and into the rut while breaking up any clods along the rut, said structural frame having a forward transverse frame member, a relatively short rear transverse frame member substantially parallel with said forward transverse frame member and having one end positioned substantially directly behind an end of said forward transverse frame member, so that said rear transverse frame member and the coextending portion of said front frame member define the width of the laterally offset portion of the structural frame, said structural frame being provided at its forward end with a three-point hitch for attachment to a conventional farm tractor, and having a portion offset laterally from the portion provided with the three-point hitch so as to be centered behind a rear wheel of a farm tractor hauling the machine, the rotary tillers of the pair of rotary tillers being carried by said offset portion of the structural frame at opposite sides, respectively, of the center of said offset portion; and means for powering said machine and for causing it to be transported about the field at working level.

16. An agricultural machine according to claim 15, wherein a diagonal frame member extends from the other end of the rear transverse frame member to the other end of the forward transverse frame member; and wherein an arm extends forwardly longitudinally and upwardly from fixed securement to said diagonal frame member to provide connection with the upper of the hitch members of the three-point hitch.

17. An agricultural machine according to claim 16, wherein the structural frame also comprises a longitudinal frame member fixedly interconnecting the laterally offset portion of the forward transverse frame member with the rear transverse frame member midway between the widths thereof.

18. An agricultural machine according to claim 17, including a guide shoe carried by the longitudinal frame member.

19. An agricultural machine according to claim 18, wherein the guide shoe is affixed to the lower end of a post whose upper end is affixed to the longitudinal frame member.

20. A method of smoothing a rut in a field, comprising placing the guide shoe of a machine according to claim 1 in a rut in a field; and causing the rotary tillers of said machine to rotate and said machine to be transported about the field at working level while the rotary tillers of the machine are rotating and while the machine is being guided by said guide shoe, so as to pick up earth at and along opposite sides of the rut and deposit at least a part of said earth into the rut for smoothing said rut.

21. A method of smoothing a rut in a field, comprising placing the guide shoe of a machine according to claim 14 in a rut in a field; and causing the rotary tillers of said machine to rotate and said machine to be transported about the field at working level while the rotary tillers of the machine are rotating and while the machine is being guided by said guide shoe, so as to pick up earth at and along opposite sides of the rut and deposit at least a part of said earth into the rut for smoothin said rut.

* * * * *